US009252917B2

(12) United States Patent
Currivan et al.

(10) Patent No.: US 9,252,917 B2
(45) Date of Patent: Feb. 2, 2016

(54) UPSTREAM BURST NOISE MEASUREMENT AND CHARACTERIZATION

(75) Inventors: Bruce J. Currivan, Los Altos, CA (US); Thomas J. Kolze, Phoenix, AZ (US); Jonathan S. Min, Fullerton, CA (US); Victor T. Hou, La Jolla, CA (US)

(73) Assignee: BROADCOM CORPORATION, Irvine, CA (US)

( * ) Notice: Subject to any disclaimer, the term of this patent is extended or adjusted under 35 U.S.C. 154(b) by 161 days.

(21) Appl. No.: 13/428,357

(22) Filed: Mar. 23, 2012

(65) Prior Publication Data

US 2012/0243527 A1 Sep. 27, 2012

Related U.S. Application Data

(60) Provisional application No. 61/467,673, filed on Mar. 25, 2011, provisional application No. 61/467,638, filed on Mar. 25, 2011.

(51) Int. Cl.
*H04L 1/20* (2006.01)
*H04L 1/00* (2006.01)

(52) U.S. Cl.
CPC ........ *H04L 1/004* (2013.01); *H04L 1/20* (2013.01); *H04L 2001/0096* (2013.01)

(58) Field of Classification Search
CPC . H07W 72/0446; H07W 72/04; H04B 7/2621
USPC .................................. 370/345, 549; 375/346
See application file for complete search history.

(56) References Cited

U.S. PATENT DOCUMENTS

| 6,614,799 | B1* | 9/2003 | Gummalla et al. | 370/448 |
| 6,647,070 | B1* | 11/2003 | Shalvi et al. | 375/285 |
| 6,757,253 | B1* | 6/2004 | Cooper et al. | 370/241 |
| 6,785,292 | B1* | 8/2004 | Vogel | 370/433 |
| 6,791,995 | B1* | 9/2004 | Azenkot et al. | 370/436 |
| 7,206,350 | B2* | 4/2007 | Korobkov et al. | 375/260 |
| 8,224,364 | B2* | 7/2012 | Gurney et al. | 455/509 |
| 2003/0179821 | A1* | 9/2003 | Lusky et al. | 375/224 |
| 2004/0057502 | A1* | 3/2004 | Azenkot et al. | 375/147 |
| 2010/0304772 | A1* | 12/2010 | Wang et al. | 455/509 |

* cited by examiner

*Primary Examiner* — Chandrahas Patel
*Assistant Examiner* — Lan Huong Truong
(74) *Attorney, Agent, or Firm* — Garlick & Markison; Shayne X. Short

(57) ABSTRACT

Upstream burst noise measurement and characterization. One or more communication devices is implemented to detect and measure burst noise event(s) within channel(s) associated with communication link(s) within communication system(s) or network(s). Detection and measurement of a burst noise event may be made during active communications on one or more other channels, and may be made during active communications on two channels respectively adjacent to the channel on which the burst noise event is being detected and measured. The channel on which the burst noise event is detected and measured may be an unused channel. The detection and measurement of the burst noise event may be made during a quiet time slot within one of the channels. Correlation (e.g., with respect time) may be determined with respect to different respective layers within a communication device (e.g., with respect to MAC and PHY layers).

20 Claims, 14 Drawing Sheets

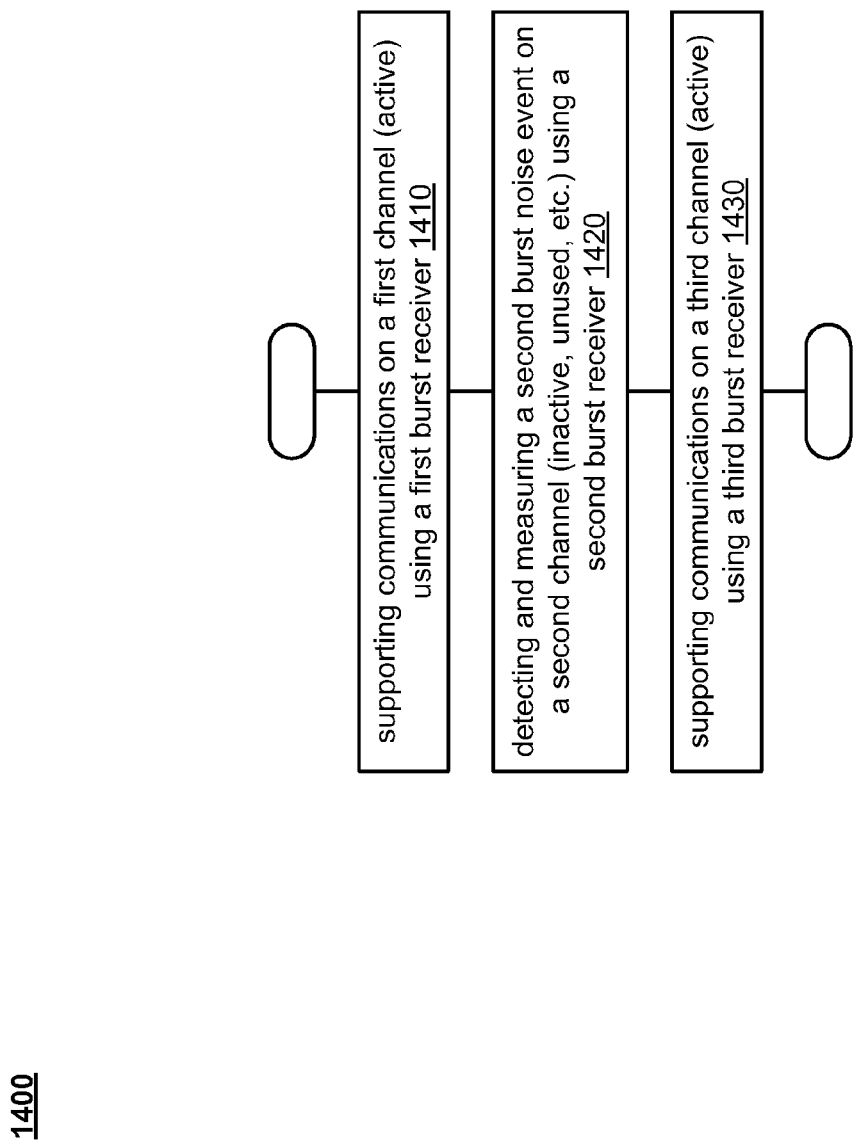

UPSTREAM BURST NOISE MEASUREMENT AND CHARACTERIZATION

CROSS REFERENCE TO RELATED PATENTS/PATENT APPLICATIONS

Provisional priority claims

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Patent Application Ser. No. 61/467,638, entitled "Detection and characterization of laser clipping within communication devices," filed Mar. 25, 2011, pending.

2. U.S. Provisional Patent Application Ser. No. 61/467,673, entitled "Upstream burst noise measurement and characterization during data transmission," filed Mar. 25, 2011, pending.

Incorporation by Reference

The following U.S. Utility Patent Application is hereby incorporated herein by reference in its entirety and made part of the present U.S. Utility Patent Application for all purposes:

1. U.S. Utility patent application Ser. No. 13/428,270, entitled "Detection and characterization of laser clipping within communication devices," filed concurrently on Mar. 23, 2012, pending, which claims priority pursuant to 35 U.S.C. §119(e) to the following U.S. Provisional Patent Applications which are hereby incorporated herein by reference in their entirety and made part of the present U.S. Utility Patent Application for all purposes:

1.1. U.S. Provisional Patent Application Ser. No. 61/467,638, entitled "Detection and characterization of laser clipping within communication devices," filed Mar. 25, 2011, pending.

1.2. U.S. Provisional Patent Application Serial No. 61/467,673, entitled "Upstream burst noise measurement and characterization during data transmission," filed Mar. 25, 2011, pending.

BACKGROUND OF THE INVENTION

1. Technical Field of the Invention

The invention relates generally to communication systems; and, more particularly, it relates to burst noise measurement and/or characterization of communication channels within such communication systems.

2. Description of Related Art

Data communication systems have been under continual development for many years. With such a communication system, characterization and/or estimation of any of a number of different parameters may be performed. For example, the communication channels are communication links over which signals traverse between communication devices may be analyzed for any of a number of reasons. For example, certain communication devices may perform appropriate processing of signals transmitted there from or received thereby based upon such characterization to improve the overall operation not only of those respective communication devices but the overall communication system. While the need to perform such characterization and/or estimation of various parameters within communication systems is well known, the prior art nonetheless continues to provide less than ideal solutions by which this may be made. As such, there continues to be a need to make such characterization and/or estimation of various parameters within communication systems in a better, more accurate, and more efficient way.

BRIEF DESCRIPTION OF THE SEVERAL VIEWS OF THE DRAWINGS

FIG. 12, FIG. 13, and FIG. 14 illustrate various alternative embodiments of a method for operating at least one communication device.

DETAILED DESCRIPTION OF THE INVENTION

Figure 1:
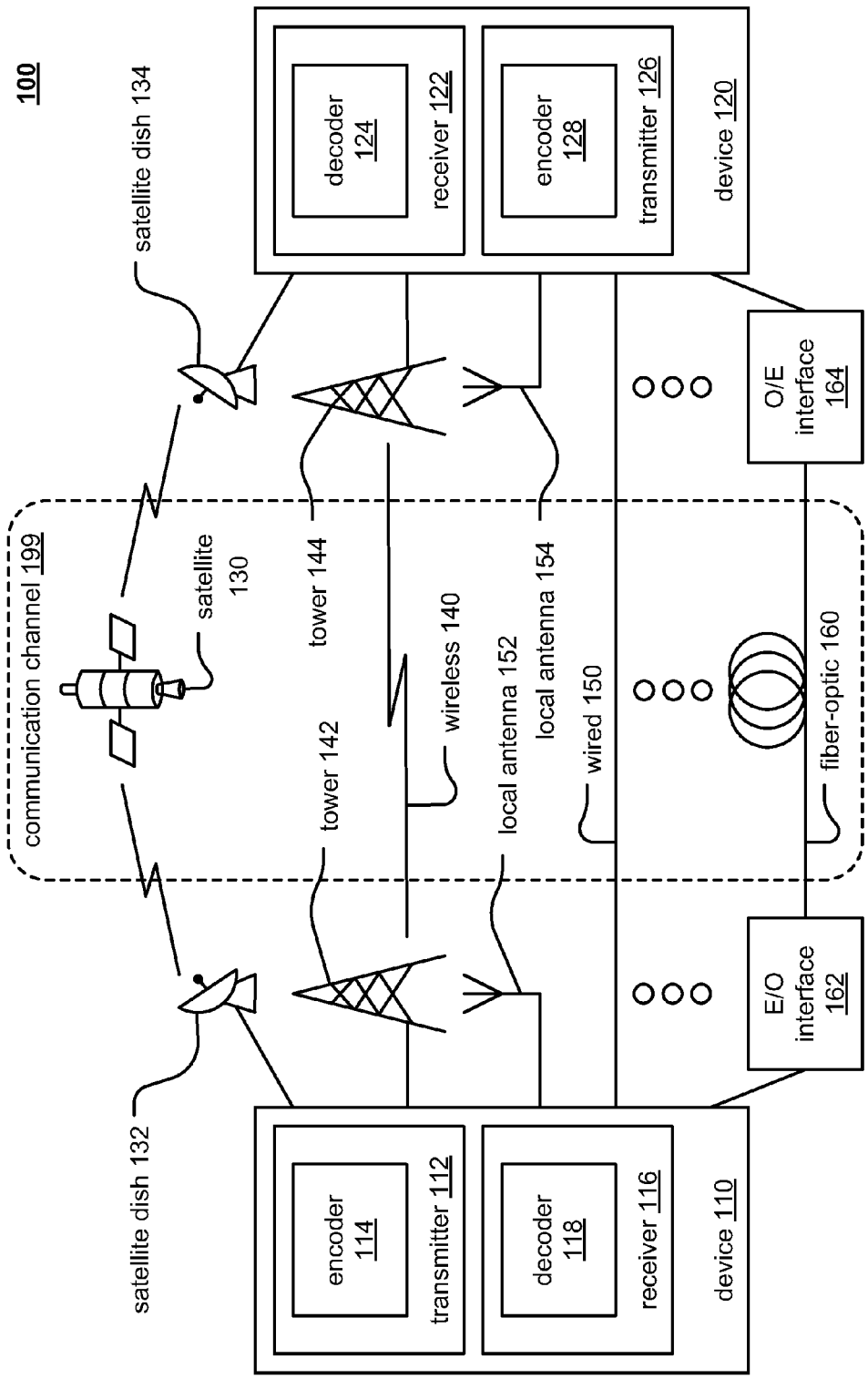
FIG. 1, FIG. 2, and FIG. 3 illustrate various embodiments of communication systems.

Within communication systems, signals are transmitted between various communication devices therein. The goal of digital communications systems is to transmit digital data from one location, or subsystem, to another either error free or with an acceptably low error rate. As shown in FIG. 1, data may be transmitted over a variety of communications channels in a wide variety of communication systems: magnetic media, wired, wireless, fiber, copper, and other types of media as well.

Figure 2:
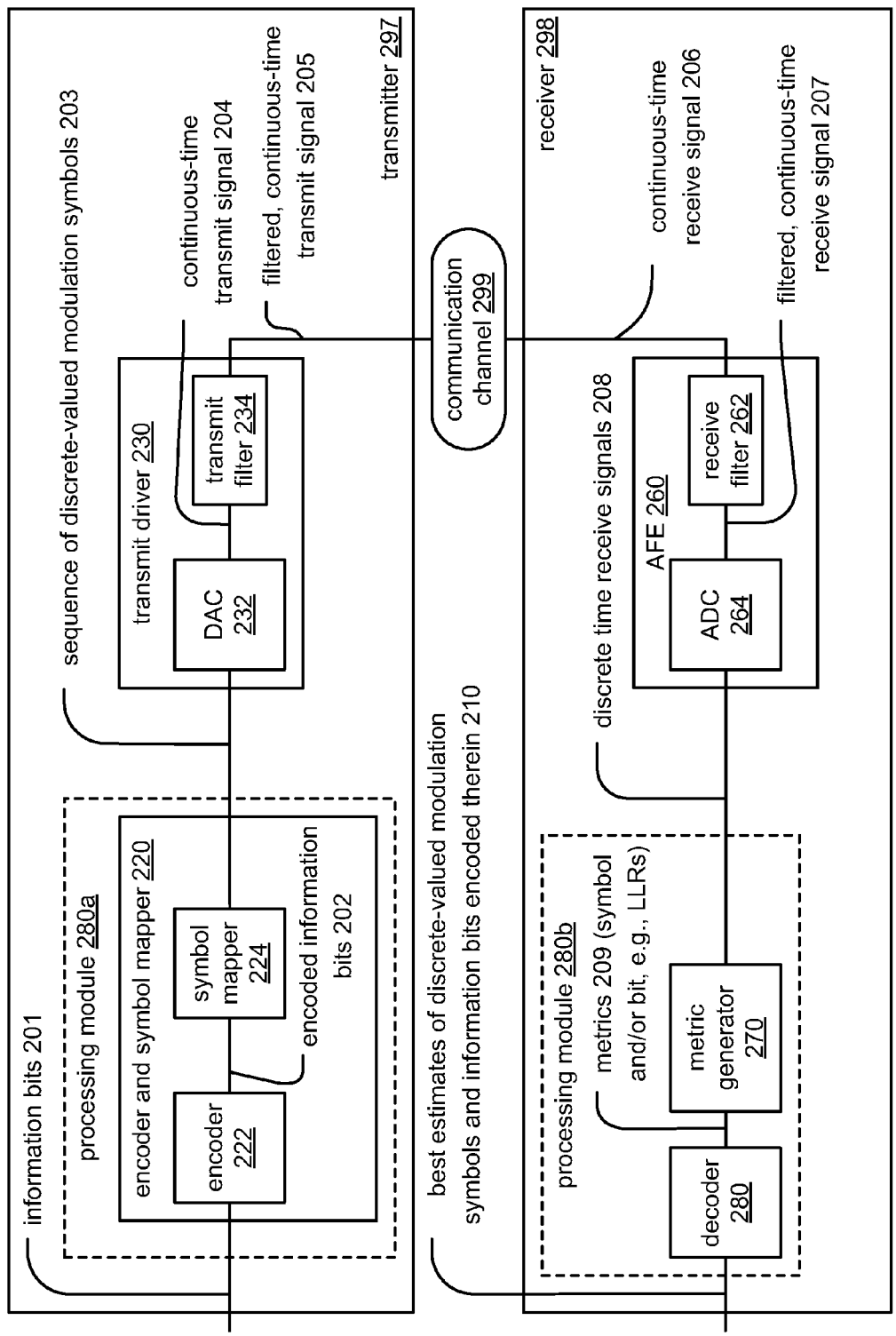

FIG. 1 and FIG. 2 are diagrams illustrate various embodiments of communication systems, 100 and 200, respectively.

Referring to FIG. 1, this embodiment of a communication system 100 is a communication channel 199 that communicatively couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199.

Any of various types of ECC codes described can be employed within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the invention. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

Referring to the communication system 200 of FIG. 2, at a transmitting end of a communication channel 299, information bits 201 (e.g., corresponding particularly to video data in one embodiment) are provided to a transmitter 297 that is operable to perform encoding of these information bits 201 using an encoder and symbol mapper 220 (which may be viewed as being distinct functional blocks 222 and 224, respectively) thereby generating a sequence of discrete-valued modulation symbols 203 that is provided to a transmit driver 230 that uses a DAC (Digital to Analog Converter) 232 to generate a continuous-time transmit signal 204 and a transmit filter 234 to generate a filtered, continuous-time transmit signal 205 that substantially comports with the communication channel 299. At a receiving end of the communication channel 299, continuous-time receive signal 206 is provided to an AFE (Analog Front End) 260 that includes a receive filter 262 (that generates a filtered, continuous-time receive signal 207) and an ADC (Analog to Digital Converter) 264 (that generates discrete-time receive signals 208). A metric generator 270 calculates metrics 209 (e.g., on either a symbol and/or bit basis) that are employed by a decoder 280 to make best estimates of the discrete-valued modulation symbols and information bits encoded therein 210.

Within each of the transmitter 297 and the receiver 298, any desired integration of various components, blocks, functional blocks, circuitries, etc. Therein may be implemented. For example, this diagram shows a processing module 280a as including the encoder and symbol mapper 220 and all associated, corresponding components therein, and a processing module 280 is shown as including the metric generator 270 and the decoder 280 and all associated, corresponding components therein. Such processing modules 280a and 280b may be respective integrated circuits. Of course, other boundaries and groupings may alternatively be performed without departing from the scope and spirit of the invention. For example, all components within the transmitter 297 may be included within a first processing module or integrated circuit, and all components within the receiver 298 may be included within a second processing module or integrated circuit. Alternatively, any other combination of components within each of the transmitter 297 and the receiver 298 may be made in other embodiments.

As with the previous embodiment, such a communication system 200 may be employed for the communication of video data is communicated from one location, or subsystem, to another (e.g., from transmitter 297 to the receiver 298 via the communication channel 299).

Figure 3:
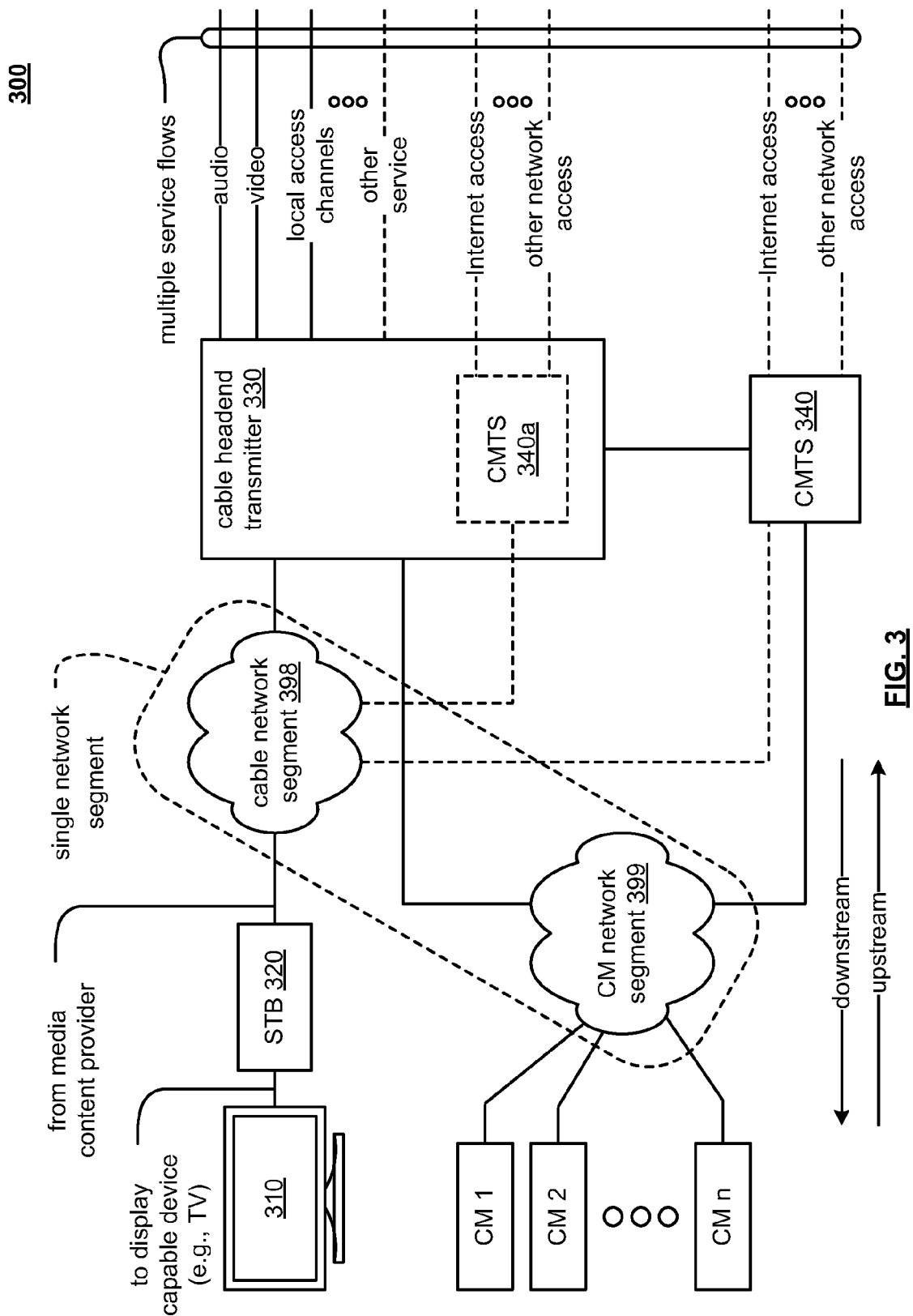

Referring to the communication system 300 of FIG. 3, this communication system 300 may be viewed particularly as being a cable system. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 300 includes a number of cable modems (shown as CM 1, CM 2, and up to CM n). A cable modem network segment 399 couples the cable modems to a cable modem termination system (CMTS) (shown as 340 or 340a and as described below).

A CMTS 340 or 340a is a component that exchanges digital signals with cable modems on the cable modem network segment 399. Each of the cable modems coupled to the cable modem network segment 399, and a number of elements may be included within the cable modem network segment 399. For example, routers, splitters, couplers, relays, and amplifiers may be contained within the cable modem network segment 399.

The cable modem network segment 399 allows communicative coupling between a cable modem (e.g., a user) and the cable headend transmitter 330 and/or CMTS 340 or 340a. Again, in some embodiments, a CMTS 340a is in fact contained within a cable headend transmitter 330. In other embodiments, the CMTS is located externally with respect to the cable headend transmitter 330 (e.g., as shown by CMTS 340). For example, the CMTS 340 may be located externally to the cable headend transmitter 330. In alternative embodiments, a CMTS 340a may be located within the cable headend transmitter 330. The CMTS 340 or 340a may be located at a local office of a cable television company or at another location within a cable system. In the following description, a CMTS 340 is used for illustration; yet, the same functionality and capability as described for the CMTS 340 may equally apply to embodiments that alternatively employ the CMTS 340a. The cable headend transmitter 330 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 330 may provide any of these various cable services via cable network segment 398 to a set top box (STB) 320, which itself may be coupled to a television 310 (or other video or audio output device). While the STB 320 receives information/services from the cable headend transmitter 330, the STB 320 functionality may also support bi-directional communication, in that, the STB 320 may independently (or in response to a user's request) communicate back to the cable headend transmitter 330 and/or further upstream.

In addition, through the CMTS 340, the cable modems are able to transmit and receive data from the Internet and/or any other network (e.g., a wide area network (WAN), internal network, etc.) to which the CMTS 340 is communicatively coupled. The operation of a CMTS, at the cable-provider's headend, may be viewed as providing analogous functions provided by a digital subscriber line access multiplexor (DSLAM) within a digital subscriber line (DSL) system. The CMTS 340 takes the traffic coming in from a group of customers on a single channel and routes it to an Internet Service Provider (ISP) for connection to the Internet, as shown via the Internet access. At the headend, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the invention.

The downstream information flows to all of the connected cable modems (e.g., CM 1, CM2, etc.). The individual network connection, within the cable modem network segment 399, decides whether a particular block of data is intended for it or not. On the upstream side, information is sent from the cable modems to the CMTS 340; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 30-40 Mega-bits per second of total throughput (e.g., currently in the DOCSIS standard, but with higher rates envisioned such as those sought after in accordance with the developing DVB-C2 (Digital Video Broadcasting-Second Generation Cable) standard, DVB-T2 (Digital Video Broadcasting-Second Generation Terrestrial) standard, etc.), this means that users may see far better performance than is available with standard dial-up modems.

Moreover, it is noted that the cable network segment 398 and the cable modem network segment 399 may actually be the very same network segment in certain embodiments. In other words, the cable network segment 398 and the cable modem network segment 399 need not be two separate network segments, but they may simply be one single network segment that provides connectivity to both STBs and/or cable modems. In addition, the CMTS 340 or 340*a* may also be coupled to the cable network segment 398, as the STB 320 may itself include cable modem functionality therein.

It is also noted that any one of the cable modems 1, 2, . . . m n, the cable headend transmitter 330, the CMTS 340 or 340*a*, the television 310, the STB 320, and/or any device existent within the cable network segments 398 or 399, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof.

It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Figure 4:
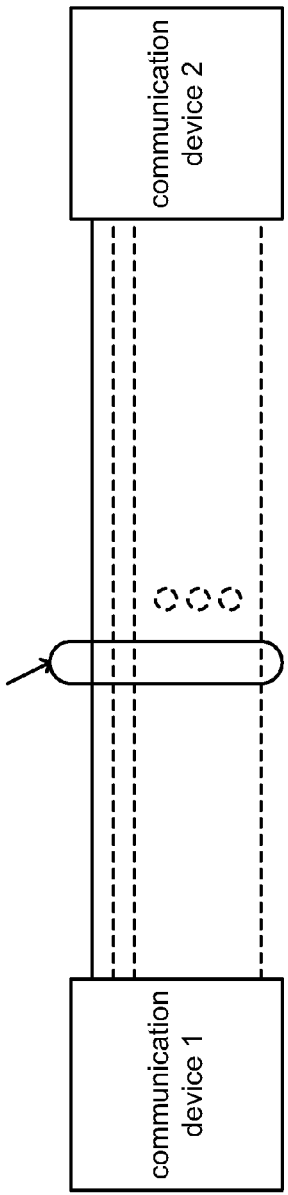
FIG. 4 illustrates an embodiment of communications between respective communication devices in a communication system, and respective channels which may be active, inactive, used, and/or unused.

FIG. 4 illustrates an embodiment 400 of communications between respective communication devices in a communication system, and respective channels which may be active, inactive, used, and/or unused. As may be seen with respect to this diagram, one or more communication channels may be implemented to effectuate and support communications between different respective communication devices of a communication system. In addition, any one of the respective communication channels may be further partitioned into respective channels. For example, a given communication channel may be further partitioned are subdivided into different respective frequency bands.

Generally speaking, each of these respective frequency bands may alternatively be referred to as a channel. At various times, different respective channels may be active or inactive. In addition, one or more respective channels may be unused in certain embodiments. Various implementations and embodiments are shown by which certain active channels and active channels may be within the various channels of a particular implementation. For example, an inactive channel may be located in between adjacent the active channels. An unused channel may be located between active channels or inactive channels, or it may be located between an active channel and an inactive channel. Generally speaking, it is noted that characterization between an active channel and an inactive channel may be viewed as being a channel having capability to be used at some times and not use it others. In contrast, an unused channel would not be used for communications at all. Of course, certain embodiments may dynamically change the character of a given channel (e.g., a channel which may be unused during one period of time may be re-characterized for use during another period of time).

Generally speaking, such a communication device (e.g., a burst receiver) may be implemented to detect and measure burst noise event within a given channel during active communications on adjacent channels. Also, while it is noted that various embodiments and/or diagrams herein are related to embodiments including a burst receiver, it is of course noted that a communication device may be implemented to include both receive and transmit capability. That is to say, such a communication device, such as a transceiver, may include both a burst receiver and a transmitter in certain embodiments.

With respect to detecting and measuring a burst noise event within a given channel during active communications on adjacent channels, the channel on which the burst noise event is detected and measured may be an inactive channel or an unused channel in various embodiments. For example, in certain embodiments, a given communication device may be implemented specifically to look at an unused channel Such detection and measurement of a burst noise event may be made with respect to that unused channel during active communications on adjacent channels.

FIG. 5, FIG. 6, FIG. 7, FIG. 8, and FIG. 9 illustrate various embodiments of a communication device.

Figure 5:
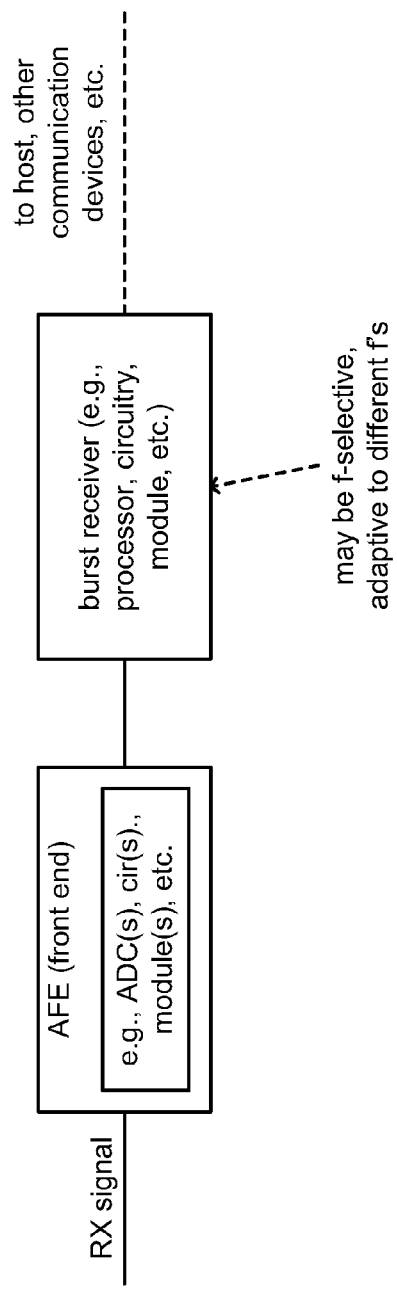
FIG. 5, FIG. 6, FIG. 7, FIG. 8, and FIG. 9 illustrate various embodiments of a communication device.

Referring to the embodiment 500 of FIG. 5, a communication device receives a signal, such as from a communication link within a communication system or network, and the signal undergoes appropriate processing by and analog front end (AFE). Such an AFE may be of amended perform any of a number of operations including digital sampling, such as by an analog to digital converter (ADC), filtering (e.g., in the analog domain and/or the digital domain), frequency conversion (e.g., such as conversion from a carrier frequency down the baseband), scaling, gain adjustment, etc. Generally, such an AFE may be viewed as performing receipt and demodulation of a signal received from any communication link. Any of a number of perspective circuitries, modules, functional blocks, etc. may be implemented within various embodiments of an AFE.

It is also noted that such a communication device as depicted within this diagram and/or others may receive information from one or more other communication devices (e.g., one or more transmitters) providing some indication regarding operation of one or more other communication devices within the communication system.

The signal output from the AFE is provided to a burst receiver implemented to detect and measure burst noise event within a given channel during active communications on other channels. For example, in one embodiment, the channel on which the burst noise event is detected and measured is implemented in between two active channels.

It is also noted that such a communication device may be frequency selective, in that, it is capable of tuning and operating with respect to different frequencies, frequency bands, etc. For example, a given singularly implementing communication device may be implemented, with such frequency tunable capability, to perform detection and measurement of burst noise events with respect to different respective channels (e.g., each respective communication channel corresponding to a different respective frequency, frequency band, etc. to which the communication device may tune or be operative for).

Figure 6:
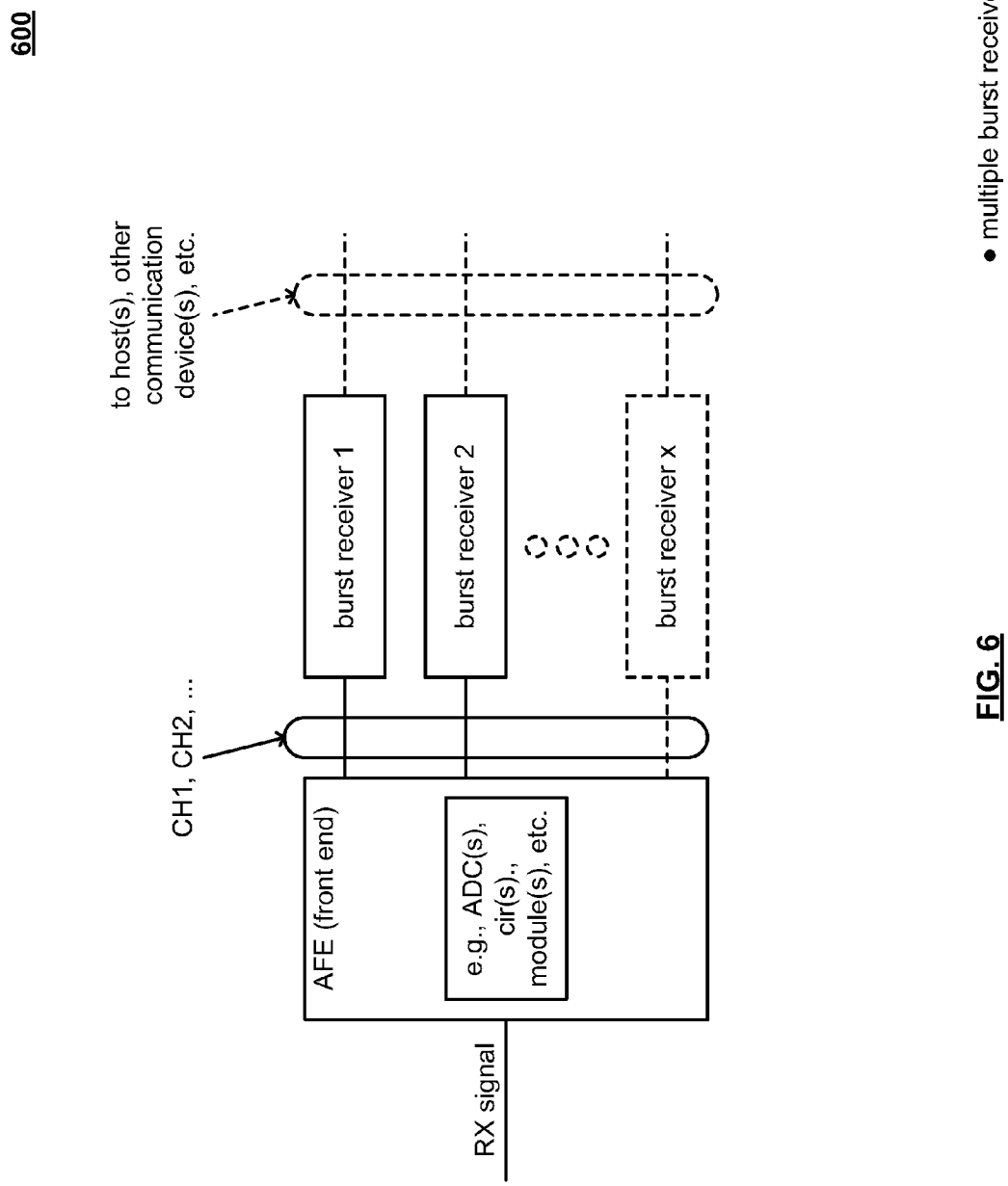

Referring to the embodiment 600 of FIG. 6, with respect to this diagram, the AFE is implemented to partition a received signal into different respective channels such that each respective channel is provided to a different respective burst receiver. Each respective burst receiver is implemented to detect and measure a burst noise event respectively within the channel corresponding thereto. That is to say, the received signal is divided or partitioned into a number of respective channels, and each respective channel is provided to a respective burst receiver that is implemented to detect and measure of burst noise event on that respective channel.

Figure 7:
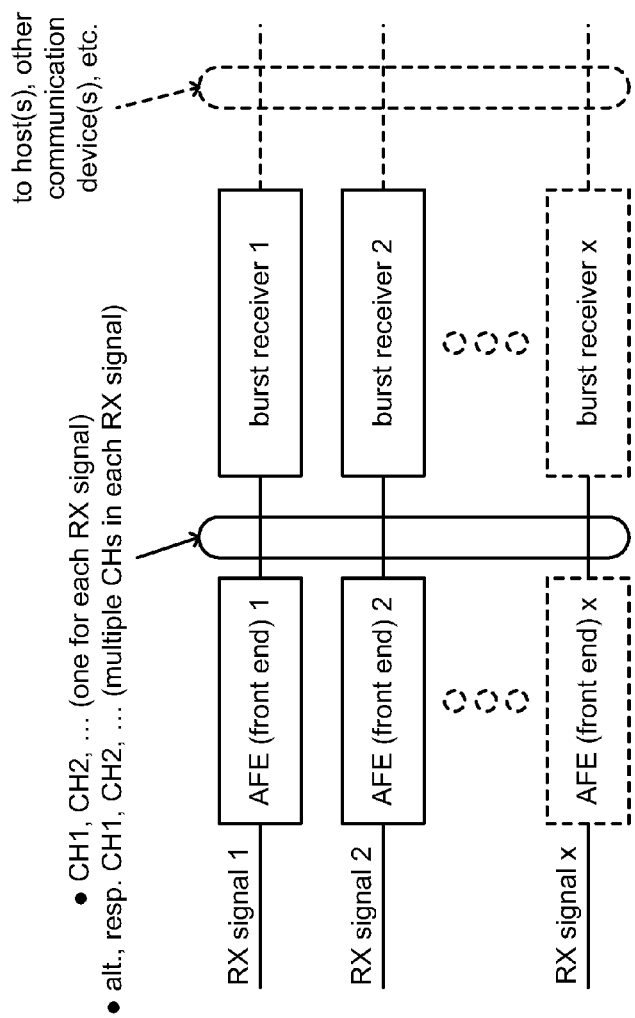

Referring to the embodiment 700 of FIG. 7, with respect to this diagram, a number of respective AFE's are implemented to receive different respective signals. In certain embodiments, each respective received signal corresponds to a different respective channel. In alternative embodiments, any one of the received signals may include multiple respective channels therein. A respective burst receiver is implemented to correspond to each respective AFE. Each burst receiver operates on the respective channel or channels provided thereto by its respective AFE. As may be understood with respect to this diagram, multiple respective burst receivers may be implemented to perform burst noise event detection and measurement with respect to different respective signals and/or different respective channels corresponding to one or more of those different respective signals.

Figure 8:
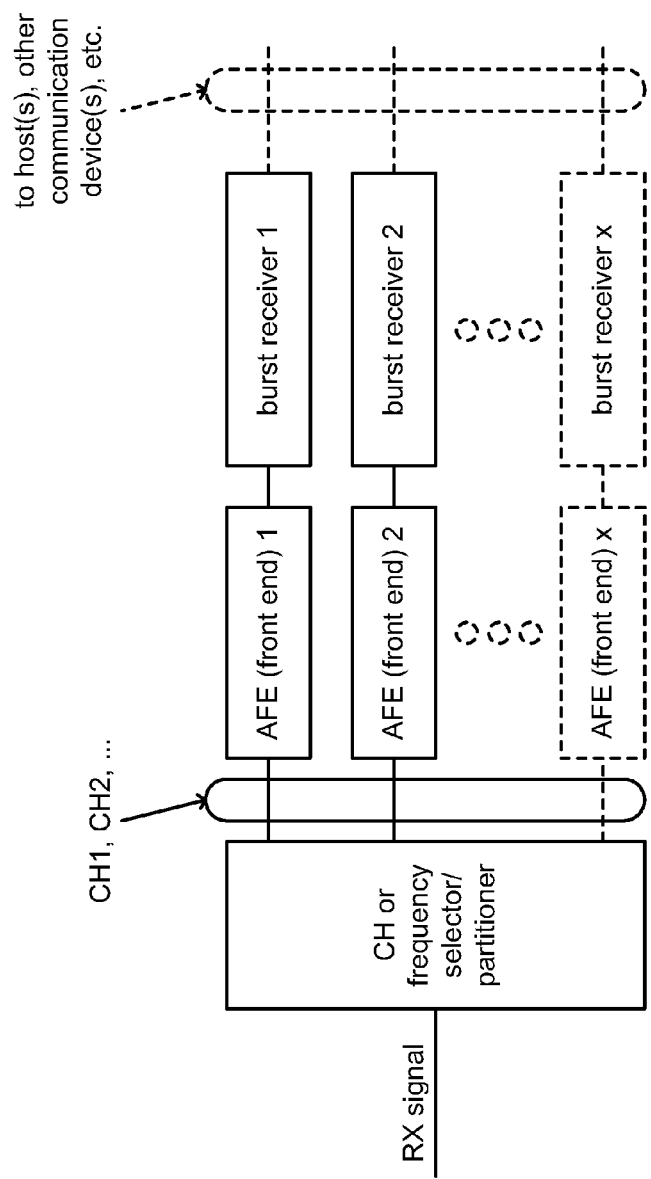

Referring to the embodiment 800 of FIG. 8, with respect to this diagram, a channel or frequency selector or partitioner is implemented to divide a received signal into multiple respective channels. The signal portions corresponding to the respective channels are provided to a number of AFE's, and the signals output from the AFE's are respectively provided to burst receivers. In this particular implementation, a number of respective burst receivers are implemented to detected measure respective burst noise events respectively within different respective channels. This diagram includes a component implemented in front of multiple AFE's to effectuate the partitioning of a received signal into a number respective channels.

Figure 9:
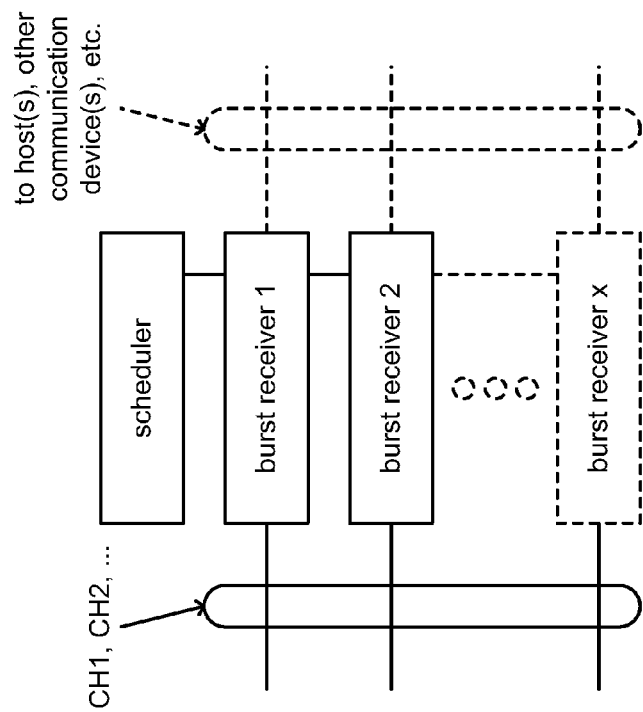

Referring to the embodiment 900 of FIG. 9, this diagram shows a scheduler in communication with (e.g., connected and/or coupled to) a number of burst receivers. Such a scheduler may be implemented within any of the various embodiments and/or diagrams described herein, or their equivalents, then include more than one respective burst receiver. Such a scheduler is implemented to schedule operation of the different respective burst receivers to detected measure one or more burst noise events. That is to say, there may be instances in which the different respective burst receivers are selectively operative to perform detection and measurement of burst noise events and to support active communications. During time periods in which a given burst receivers not supporting active communications, such a burst receiver may be employed to perform detection and measurement of a burst noise event on one or more channels.

Figure 10:
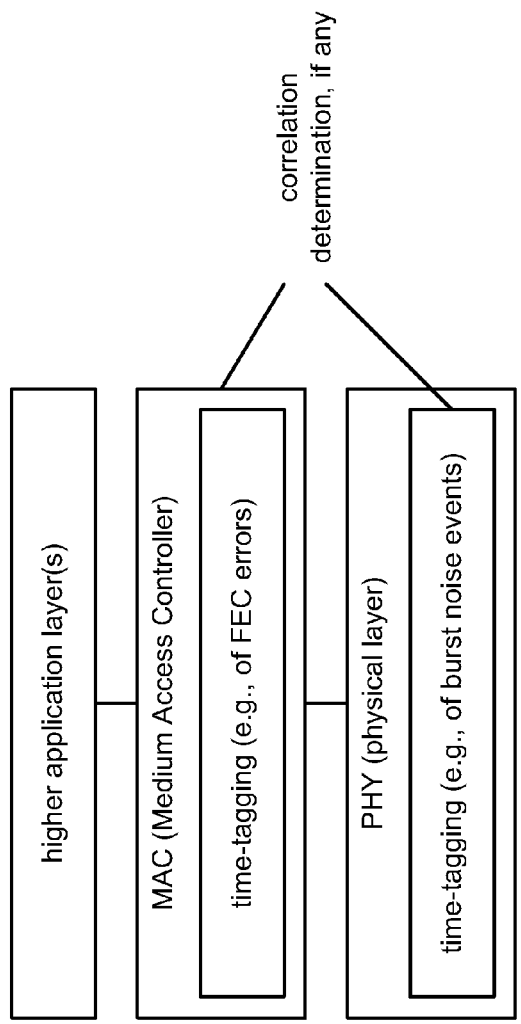
FIG. 10 illustrates an embodiment of different respective layers of a communication device including media access control (MAC) and physical layer (PHY).

FIG. 10 illustrates an embodiment of different respective layers of a communication device including media access control (MAC) and physical layer (PHY). As may be understood with respect to different operational layers corresponding to a communication device, the PHY is the lowest layer corresponding to an actual communication channel and the signaling of information thereby. The MAC is a relatively higher layer within a communication device that performs higher layer operations such as error correction code (ECC) coding, forward error correction (FEC) coding, etc.

In some embodiments, to perform effective detection and characterization of such burst noise events such as those seen by a decoder (e.g., one operating in accordance with one or more ECC's, FEC's, such as a Reed-Solomon (RS) decoder, a turbo decoder, an low density parity check (LDPC) decoder, a trellis decoder, a turbo trellis coded modulation (TTCM) decoder, etc.), appropriate correlation of error events as identified in accordance with such decoding (at the MAC layer) and those identified at the PHY layer may be made. To determine such correlation, if any, respective time-tagging may be made with respect to the different respective occurrences at both the MAC and PHY layers, respectively. For example, time-tagging of FEC errors may be made at the MAC layer, in time-tagging of burst noise events may be made at the PHY layer. When correlation is determined based upon these different respective phenomena, it may be determined with and even improved level of certainty that a burst noise event has in fact occurred.

As may be understood with respect to various aspects, and their equivalents, of the invention, a novel approach is presented herein to measure burst/impulse noise on an upstream communication system (e.g., a cable plant in certain embodiments) while data is being transmitted on the communication system.

Measuring Burst Noise During Active Data Transmission

A burst receiver may include functionality to detect and measure burst noise events during quiet time slots on the channel. The following measurements can be provided for each burst noise event:

Time stamp of onset of burst noise event
Duration of burst noise event
Amplitude of burst noise The above measurements are based on user-defined threshold settings.

Using the above burst-noise measurement capability, one or more components (e.g., such as one or more analysis filters with post-processing capability, analysis receiver(s) and/or other device(s) [such as a device, another burst receiver, and/or a burst receiver which may have relatively less than full burst receiver functionality] implemented to perform analysis filtering) may be positioned using a narrow symbol-rate bandwidth (160 ksps [kilo-symbols per second] up to 1.28 Msps [Mega-symbols per second]) in the roll-off region between two active DOCSIS channels, and analyze burst noise events while data is being transmitted in the active channels on each side.

In certain embodiments, a burst receiver may be positioned in an unused channel (as also described elsewhere herein), in an unused band among active channels, or perhaps below 10 MHz or even at high frequencies above 42 MHz. The latter depends on whether a diplexer or anti-aliasing filter removes the higher frequencies before they can reach the receiver.

With more complexity, the scheduler could schedule quiet times in one upstream channel while active transmissions are occurring in a nearby channel, and vice-versa, in a complementary or "checkerboard" manner. Thus there would always be a receiver looking at burst noise events during quiet times on its channel, during active transmissions on the other channel.

The same concept could be extended to S-CDMA. The unused codes could be used as burst noise detectors. Since the unused codes are transmitted with zero energy, any energy that is detected at the despreader output for that code, can be interpreted as at least partially coming from the noise on the channel.

Measuring FEC Error Events

Certain implementations operate with a design directive to detect and characterize error events as seen by the FEC decoder (Reed-Solomon and/or trellis). Secondary goal is to correlate error events between the PHY (time tags from Method A above) and FEC.

Such a burst receiver as described above may be implemented to include functionality to compile FEC error event statistics. With further processing, these error events can be time-tagged. In order to correlate the times that PHY and FEC burst error events take place, both respective events may be time-tagged.

One issue for consideration is how rapidly an FEC error counter may be read. If it can be read rapidly, this is equivalent to fine time resolution on when the error events occur. For example, if the FEC error counter is read 100 times per second, then it may be determined when error events occur to a resolution of 10 ms.

In addition to the FEC error counter, prepend data is sent out with each packet from the PHY to the MAC. This prepend data contains additional information on the FEC error counters, which will allow greater insight into which FEC blocks are in error. Using knowledge of when an errored block was transmitted, comparison may be made with the error events seen by the FEC, with the error events logged as described above.

Figure 11:
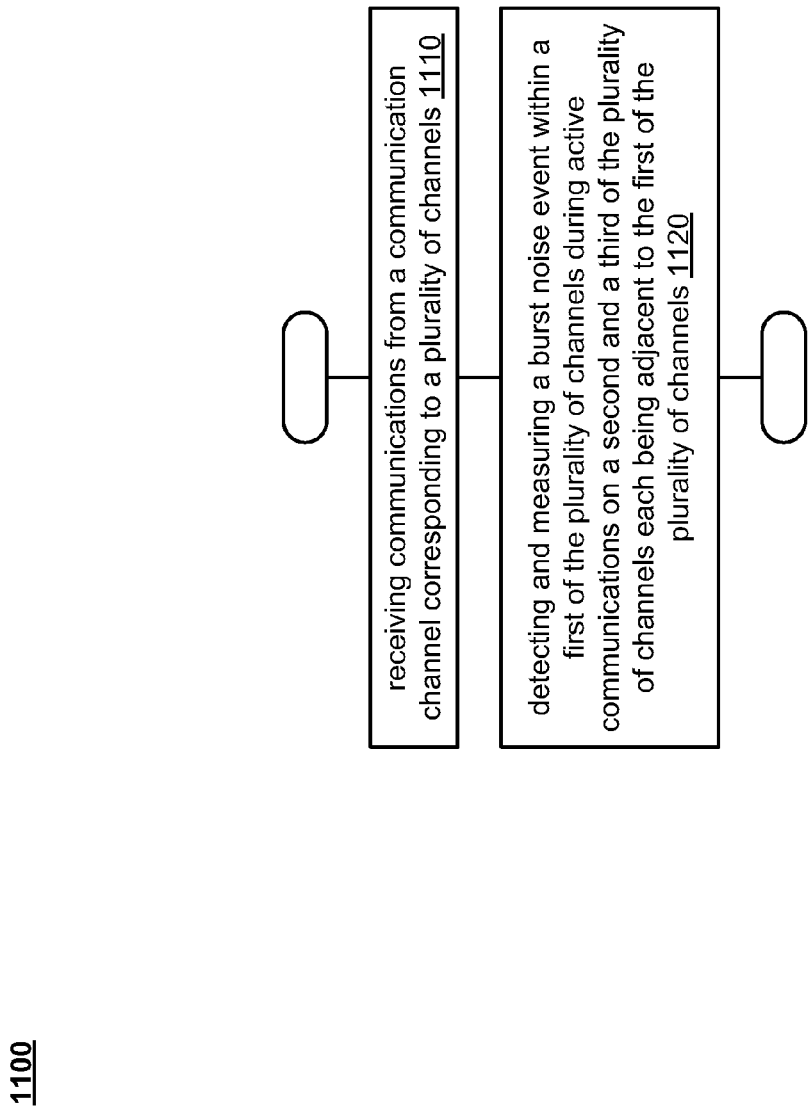
FIG. 11 illustrates an embodiment of a method for operating at least one communication device.

FIG. 11 illustrates an embodiment of a method for operating at least one communication device.

Referring to method 1100 of FIG. 11, the method 1100 begins by receiving communications from the communication channel corresponding to a plurality of channels, as shown in a block 1110. For example, via an input of the communication device, one or more communications may be received from at least one additional communication device. Those communications may be provided via one or more channels of the communication channel.

The method 1100 continues by detecting and measuring a burst noise event within a first of the plurality of channels during active communications on a second and a third of the plurality of channels each being adjacent to the first of the plurality of channels, as shown in a block 1120. For example, the channel for which the burst noise event is being detected and measured may be viewed as being implemented in between two other channels. The detection and measurement of the burst noise event may be made during active communications on those adjacent channels.

Figure 12:
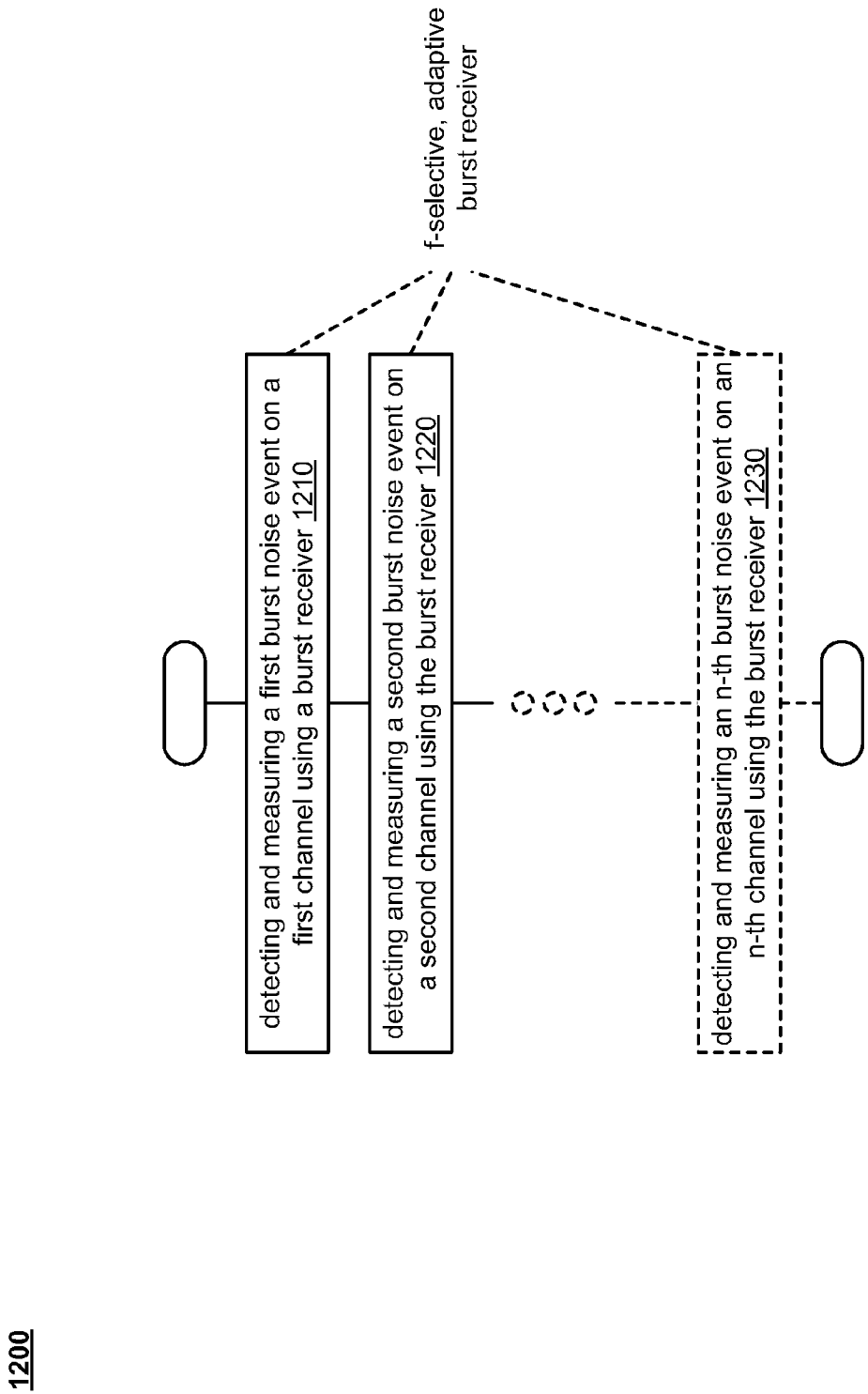
Figure 13:
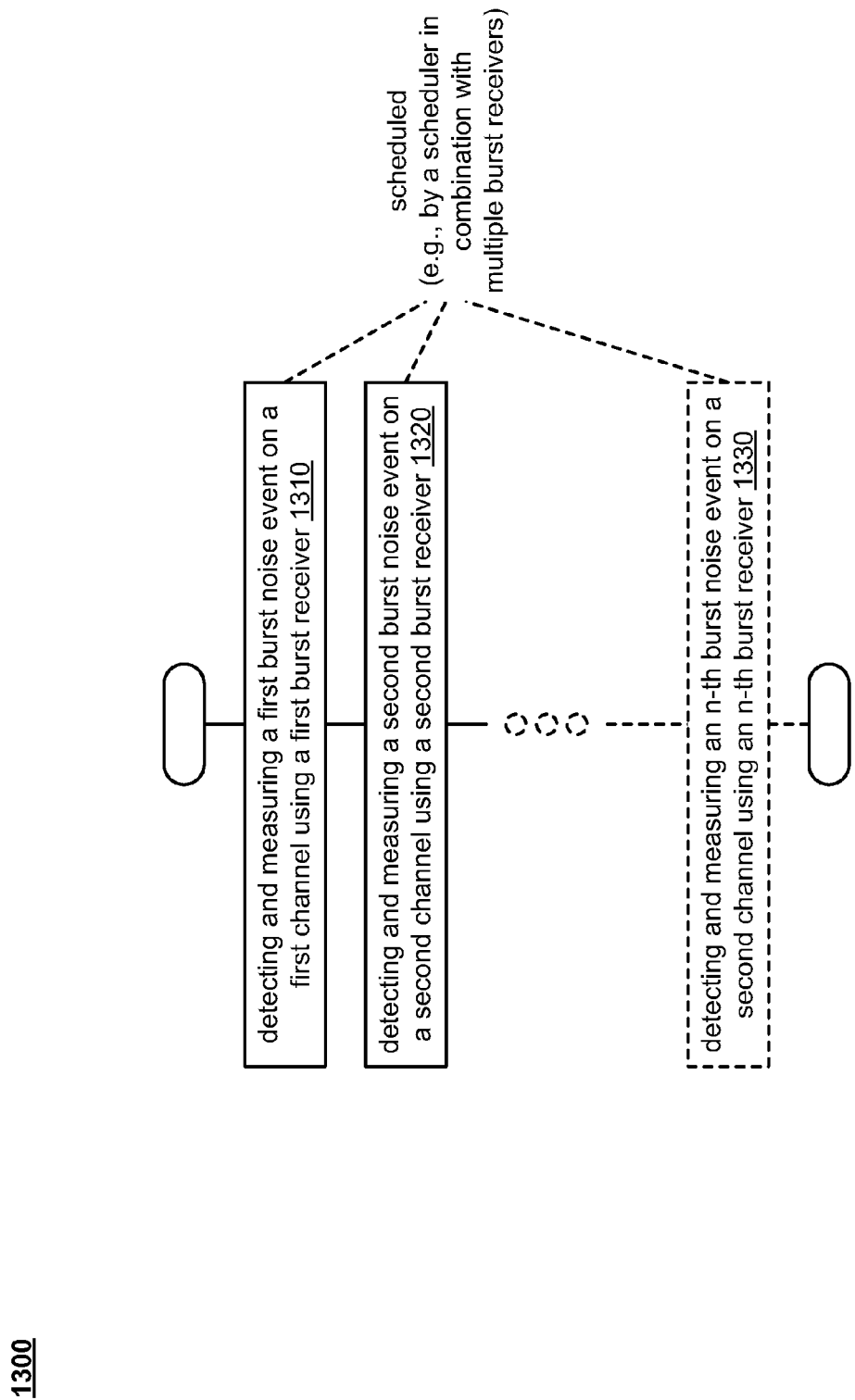

FIG. 12, FIG. 13, and FIG. 14 illustrate various alternative embodiments of a method for operating at least one communication device.

Referring to method 1200 of FIG. 12, the method 1200 begins by detecting and measuring a first burst noise event on a first channel using a burst receiver, as shown in a block 1210. The method 1200 continues by detecting and measuring a second burst noise event on a second channel using the burst receiver, as shown in a block 1220. As may be understood, the operations with respect to the blocks 1210 and 1220 operate using the same burst receiver. Such operations may continue such that the method 1200 then operates by detecting and measuring an n-th burst noise event on an n-th channel using the burst receiver, as shown in a block 1230. A frequency selective and adaptive burst receiver may be implemented to perform the method 1200. That is to say, such a communication device may be capable of her operative to perform tuning to different respective channels. At different respective times, such a communication device may tune two different respective channels to perform detection and measurement of burst noise events respectively on those different respective channels.

Referring to method 1300 of FIG. 13, the method 1300 begins by detecting and measuring a first burst noise event on a first channel using a first burst receiver, as shown in a block 1310. The method 1300 continues by detecting and measuring a second burst noise event on a second channel using a second burst receiver, as shown in a block 1320. Such operations may continue such that the method 1300 then operates by detecting and measuring an n-th burst noise event on an n-th channel using an n-th burst receiver, as shown in a block 1330.

As may be understood with respect to this diagram, the operations performed by the different respective burst receivers may be scheduled (e.g., such as by a scheduler implemented in combination with multiple burst receivers).

Referring to method 1400 of FIG. 14, the method 1400 begins by supporting communications on a first channel (e.g., an active channel) using a first burst receiver, as shown in a block 1410. The method 1400 continues by detecting and measuring a second burst noise event on a second channel (e.g., an inactive channel, an unused channel, etc.) using a second burst receiver, as shown in a block 1420. The method 1400 then operates by supporting communications on a third channel (e.g., an active channel) using a third burst receiver, as shown in a block 1430. From certain perspectives, the operations associated with the method 1400 may be viewed as detecting and measuring a burst noise event using a burst receiver implemented on an inactive or unused channel, while communications are in fact supported on at least two other respective channels and serviced by two other respective burst receivers. In some embodiments, the second burst receiver and the second channel correspond to a channel that is implemented in between and adjacent to the first channel associated with the first burst receiver and the third channel associated with the third verse receiver.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the invention, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 (or alternatively, when the magnitude of signal 2 is less than that of signal 1).

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contrary, signals to, from, and/or between elements in a figure of any of the figures presented herein may be analog or digital, continuous time or discrete time, electrical, optical, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. An apparatus comprising:
   at least one input configured to receive communications from a communication channel corresponding to a plurality of channels;
   a first burst receiver configured to detect and measure a first burst noise event based on energy within a first of the plurality of channels during a first quiet time slot during which the first of the plurality of channels is inactive and unused during active communications on a second and a third of the plurality of channels each being adjacent to the first of the plurality of channels, wherein first measurement of the first burst noise event includes a first duration and a first amplitude;
   a second burst receiver configured to detect and measure a second burst noise event based on energy within the second of the plurality of channels during a second quiet time slot during which the second of the plurality of channels is inactive and unused during active communications on the first and a fourth of the plurality of channels each being adjacent to the second of the plurality of channels, wherein second measurement of the second burst noise event includes a second duration and a second amplitude; and
   a scheduler configured to schedule operation of the first burst receiver configured to detect and measure the burst noise event and the second burst receiver configured to detect and measure the second burst noise event.

2. The apparatus of claim 1, wherein:
   at least one of the first burst receiver or the second burst receiver including a physical layer (PHY) portion and a media access control (MAC) portion;
   the PHY portion configured to time-tag the burst noise event;
   the MAC portion configured to perform forward error correction (FEC) decoding of at least some of the communications to identify an FEC error event and to time-tag the FEC error event; and
   at least one of the first burst receiver or the second burst receiver configured to identify timing correlation, if any, between the burst noise event and the FEC error event based on time-tags corresponding thereto.

3. The apparatus of claim 1 further comprising:
   a third burst receiver configured to detect and measure a third burst noise event within an inactive and unused one of the plurality of channels during active communications on two other of the plurality of channels each being adjacent to the inactive and unused one of the plurality of channels.

4. The apparatus of claim 3, wherein the inactive and unused one of the plurality of channels corresponding to a roll-off region between the two other of the plurality of channels each being adjacent to the inactive and unused one of the plurality of channels.

5. The apparatus of claim 1 further comprising:
   a communication device that is operative within at least one of a satellite communication system, a wireless communication system, a wired communication system, a fiber-optic communication system, a mobile communication system, or a cable system.

6. An apparatus comprising:
   at least one input configured to receive communications from a communication channel corresponding to a plurality of channels; and
   a burst receiver configured to detect and measure a burst noise event based on energy within a first of the plurality of channels that is inactive and unused during active communications on a second and a third of the plurality of channels each being adjacent to the first of the plurality of channels, wherein measurement of the burst noise event includes a duration and an amplitude.

7. The apparatus of claim 6, wherein:
   the burst receiver being a first burst receiver; and further comprising:

a second burst receiver configured to support first active communications on the second of the plurality of channels; and a third burst receiver configured to support second active communications on the third of the plurality of channels, wherein the first of the plurality of channels corresponding to a roll-off region between the second and the third of the plurality of channels.

8. The apparatus of claim 6, wherein:

the burst receiver including a physical layer (PHY) portion and a media access control (MAC) portion;

the PHY portion configured to time-tag the burst noise event;

the MAC portion configured to perform forward error correction (FEC) decoding of at least some of the communications to identify an FEC error event and to time-tag the FEC error event; and the burst receiver configured to identify timing correlation, if any, between the burst noise event and the FEC error event based on time-tags corresponding thereto.

9. The apparatus of claim 6 further comprising:

a cable modem, a cable headend transmitter, or a cable modem termination system (CMTS).

10. The apparatus of claim 6 further comprising:

at least one additional burst receiver configured to detect and measure at least one additional burst noise event within the second of the plurality of channels during active communications on the first and a fourth of the plurality of channels each being adjacent to the second of the plurality of channels.

11. The apparatus of claim 6 further comprising:

at least one additional burst receiver configured to detect and measure at least one additional burst noise event within the second of the plurality of channels during active communications on the first and a fourth of the plurality of channels each being adjacent to the second of the plurality of channels; and a scheduler configured to schedule operation of the burst receiver configured to detect and measure the burst noise event and the at least one additional burst receiver configured to detect and measure the at least one additional burst noise event.

12. The apparatus of claim 6 further comprising:

the burst receiver configured to detect and measure the burst noise event within the first of the plurality of channels during a quiet time slot during which the first of the plurality of channels is inactive and unused.

13. The apparatus of claim 6 further comprising:

a communication device that is operative within at least one of a satellite communication system, a wireless communication system, a wired communication system, a fiber-optic communication system, a mobile communication system, or a cable system.

14. A method for execution by a communication device, the method comprising:

via at least one input of the communication device, receiving communications from a communication channel corresponding to a plurality of channels; and detecting and measuring a burst noise event based on energy within a first of the plurality of channels that is inactive and unused during active communications on a second and a third of the plurality of channels each being adjacent to the first of the plurality of channels, wherein measurement of the burst noise event includes a duration and an amplitude.

15. The method of claim 14 further comprising:

detecting and measuring the burst noise event using a first burst receiver;

operating a second burst receiver to support first active communications on the second of the plurality of channels; and operating a third burst receiver to support second active communications on the third of the plurality of channels, wherein the first of the plurality of channels corresponding to a roll-off region between the second and the third of the plurality of channels.

16. The method of claim 14 further comprising:

detecting and measuring the burst noise event using a burst receiver including a physical layer (PHY) portion and a media access control (MAC) portion;

employing the PHY portion to time-tag the burst noise event;

employing the MAC portion to perform forward error correction (FEC) decoding of at least some of the communications to identify an FEC error event and to time-tag the FEC error event; and identifying timing correlation, if any, between the burst noise event and the FEC error event based on time-tags corresponding thereto.

17. The method of claim 14, wherein the first of the plurality of channels being an unused channel within the plurality of channels.

18. The method of claim 14 further comprising:

detecting and measuring the burst noise event using a first burst receiver; and operating a second burst receiver to detect and measure another burst noise event within the second of the plurality of channels during active communications on the first and a fourth of the plurality of channels each being adjacent to the second of the plurality of channels.

19. The method of claim 18 further comprising:

scheduling operation of the first burst receiver to detect and measure the burst noise event and the second burst receiver to detect and measure the another burst noise event.

20. The method of claim 14, wherein the communication device is operative within at least one of a satellite communication system, a wireless communication system, a wired communication system, a fiber-optic communication system, a mobile communication system, or a cable system.

* * * * *